United States Patent
Takeuchi

[19]

[11] Patent Number: 6,030,567
[45] Date of Patent: Feb. 29, 2000

[54] PROCESS FOR PRODUCING SANDWICH-SHAPED SYNTHETIC RESIN-MOLDED ARTICLE

[75] Inventor: Atsushi Takeuchi, Saitama-ken, Japan

[73] Assignee: Honda Giken Kogyo Kabushiki Kaisha, Tokyo, Japan

[21] Appl. No.: 09/000,044

[22] PCT Filed: Nov. 5, 1996

[86] PCT No.: PCT/JP96/03225

§ 371 Date: Apr. 29, 1998

§ 102(e) Date: Apr. 29, 1998

[87] PCT Pub. No.: WO97/16295

PCT Pub. Date: May 9, 1997

[30] Foreign Application Priority Data

Nov. 2, 1995 [JP] Japan .................................. 7-286204

[51] Int. Cl.[7] .................................................. B28B 7/22
[52] U.S. Cl. ................ 264/255; 264/328.8; 264/328.13; 425/130; 293/120
[58] Field of Search .................... 264/255, 328.8, 264/328.13, 245, 45.1, 46.6; 425/130; 293/120

[56] References Cited

U.S. PATENT DOCUMENTS

| | | | |
|---|---|---|---|
| 4,120,922 | 10/1978 | Lemelson | 264/40.7 |
| 4,174,413 | 11/1979 | Yasuike et al. | 428/35 |
| 4,366,110 | 12/1982 | Morita et al. | 264/328.13 |
| 4,550,043 | 10/1985 | Beck | 428/36 |
| 5,059,361 | 10/1991 | Da Re | 264/25 |
| 5,178,805 | 1/1993 | Yokota | 264/40.1 |
| 5,423,673 | 6/1995 | Sawae et al. | 425/572 |

FOREIGN PATENT DOCUMENTS

| | | |
|---|---|---|
| 51-109952 | 9/1976 | Japan . |
| 60-8023 | 1/1985 | Japan . |
| 5-131495 | 5/1993 | Japan . |
| 5-169492 | 7/1993 | Japan . |
| 6-328509 | 11/1994 | Japan . |
| 2087299 | 5/1982 | United Kingdom . |

*Primary Examiner*—Jan H. Silbaugh
*Assistant Examiner*—Suzanne E. Mason
*Attorney, Agent, or Firm*—Nikaido Marmelstein Murray & Oram, LLP

[57] ABSTRACT

In producing a sandwich-shaped synthetic resin-molded article of a high quality comprised of a core and an outer layer covering the core, the following steps are used: a first step of injecting an outer layer forming material into a forming cavity in a mold through a gate at an injecting speed $V_1$, a second step including an injecting stage in which an injection speed $V_2$ of the core forming material is set to be higher than the injection speed $V_1$ at the first step, in order to inject a core forming material under the injection of the outer layer forming material to flow into the outer layer forming material present within the gate and the cavity and to allow the outer layer and core forming materials to flow within the cavity, and a third step of injecting said outer layer forming material at an injection speed $V_3$ equal to or lower than the final injection speed of the outer layer forming material at the second step, and pushing the core and outer layer forming materials having a double structure existing within the gate into the cavity, thereby forming the core and the outer layer.

2 Claims, 10 Drawing Sheets

PROCESS FOR PRODUCING SANDWICH-SHAPED SYNTHETIC RESIN-MOLDED ARTICLE

FIELD OF THE INVENTION

The present invention relates to an improvement in a process for producing a sandwich-shaped synthetic resin-molded article, and in particular, to a process for producing a sandwich-shaped synthetic resin-molded article comprised of a core and an outer layer which covers the core, comprising a first step of injecting an outer layer forming material into a forming cavity in a mold through a gate, a second step of injecting a core forming material to flow into the outer layer forming material present within the gate and the cavity and to allow the outer layer and core forming materials to flow within the cavity, and a third step of pushing the core and outer layer forming materials having a double structure existing within the gate into the cavity by the outer layer forming material, thereby molding the core and the outer layer.

BACKGROUND ART

There is such a conventionally known producing process disclosed in Japanese Patent Application Laid-open No.6-328509. In this case, the maximum value of an injection speed $V_2$ of the core forming material at the second step is set to be lower than the maximum value of an injection speed $V_1$ of the outer layer forming material at the first step.

In a producing process of such type, while the outer layer forming material is flowing within the cavity, the core forming material is allowed to flow into the outer layer forming material. However, after a front portion of the outer layer forming material in a flowing direction reaches a terminal end of the cavity to stop its flowing, it is difficult to allow the core forming material to flow into the front portion of the outer layer forming material in the flowing direction.

If the injection speed is set as in the prior art under such a circumstance, the following problem is liable to arise: The front portion of the core forming material in the flowing direction has not yet flown into the front portion of the outer layer forming material in the flowing direction at a time point when the front portion of the outer layer forming material in the flowing direction reaches near the terminal end of the cavity. Due to this, it is impossible to allow the core forming material to flow into the front portion of the outer layer forming material in the flowing direction and hence, it is impossible to produce a synthetic resin-molded article having a sandwich structure over the whole thereof.

DISCLOSURE OF THE INVENTION

It is an object of the present invention to provide a producing process of the above-described type, wherein the core forming material can be reliably allowed to flow into the front portion of the outer layer forming material in the flowing direction, thereby producing a synthetic resin-molded article having a sandwich structure over the whole thereof.

To achieve the above object, according to the present invention, there is provided a process for producing a sandwich-shaped synthetic resin-molded article comprised of a core and an outer layer which covers the core, the process comprising a first step of injecting an outer layer forming material into a forming cavity in a mold through a gate at an injecting speed $V_1$, a second step of injecting a core forming material at an injection speed $V_2$ higher than the injection speed $V_1$, while injecting the outer layer forming material at the injection speed $V_1$, in order to allow the core forming material to flow into the outer layer forming material present within the gate and the cavity and to allow the outer layer and core forming materials to flow within the cavity, the injection speed of the outer layer forming material being then reduced to be lower than the injection speed $V_1$, while the injection speed $V_2$ is maintained, and a third step of injecting the outer layer forming material at an injection speed $V_3$ equal to or lower than a final injection speed of the outer layer forming material at the second step, and pushing the core and outer layer forming materials having a double structure and existing within the gate into the cavity, thereby molding the core and the outer layer.

If the injection speed $V_2$ of the core forming material at the second step is set to be higher than the injection speed $V_1$ of the outer layer forming material at the first step, as described above, the filling efficiency of the core forming material can be enhanced. Thus, at a time point when a front portion of the outer layer forming material in a flowing direction reaches near a terminal end of the cavity, a front portion of the core forming material in a flowing direction can be allowed to exist within such front portion of the outer layer forming material in the flowing direction.

If the injection speed $V_1$ of the outer layer forming material is reduced to relatively further increase the injection speed $V_2$ of the core forming material before the start of the second step, there is a possibility that the following disadvantage may arise: the thickness of the outer layer is reduced due to the rapid flowing of the core forming material into the outer layer forming material. This is liable to occur when a hot runner is used.

In the present invention, at an initial stage of the start of the second step, the injection speed $V_1$ of the outer layer forming material is maintained at the same level as that at the first step and hence, the disadvantage as described above is reliably avoided.

Thereafter, the injection speed of the outer layer forming material is controlled to be lower than the injection speed $V_1$ and hence, the injection speed $V_2$ of the core forming material is relatively further increased. Thus, it is possible to enhance the filling efficiency of the core forming material and in its turn, to shorten the cycle time for the production of the molded article.

If the injection speed $V_3$ of the outer layer forming material at the third step is set to be equal to or lower than the final injection speed of the outer layer forming material at the second step, the outer layer forming material cannot flow into the core forming material at the third step, whereby portions of the synthetic resin-molded article communicating with the gate can be formed by only the outer layer forming material.

In this manner, it is possible to produce a synthetic resin-molded article of a high quality having a sandwich structure over the whole thereof and to enhance the mass productivity of the molded article.

BEST MODE FOR CARRYING OUT THE INVENTION

Figure 1:
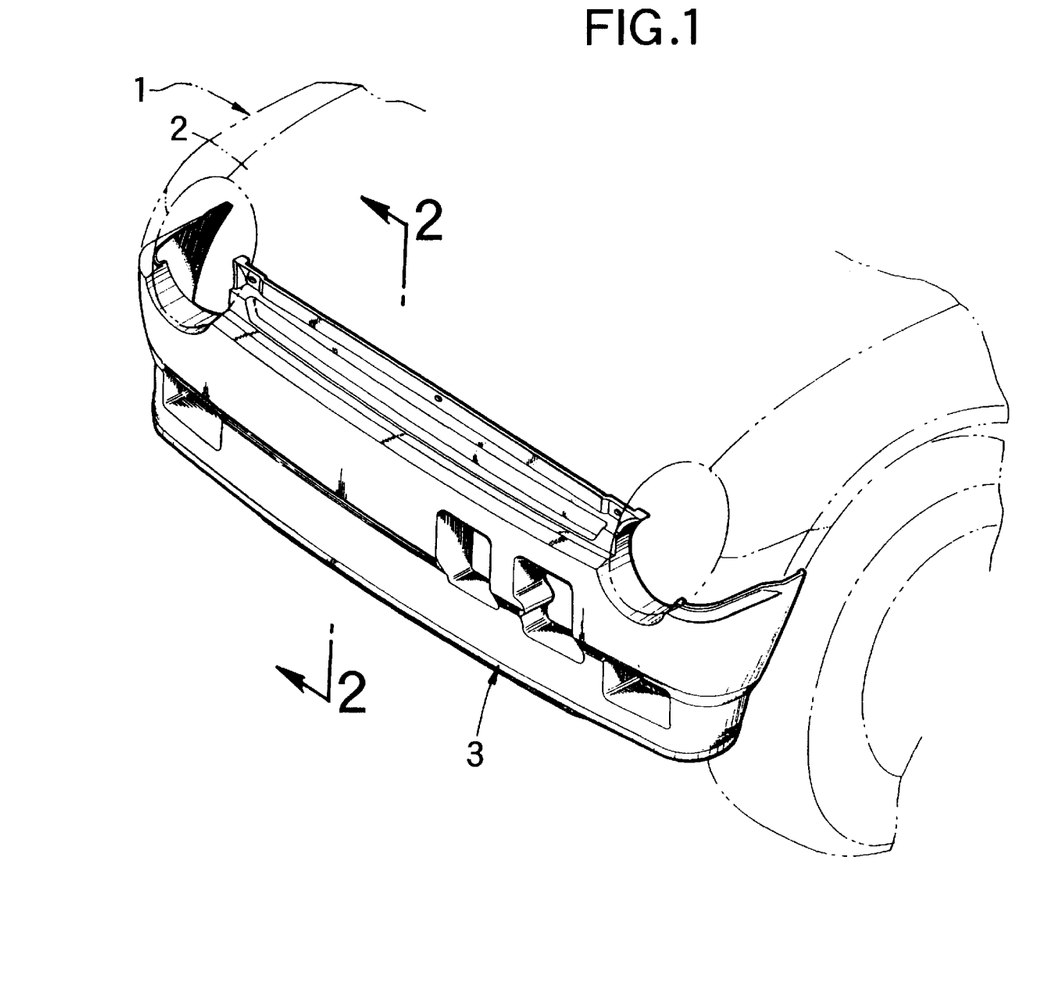
FIG. 1 is a perspective view of a bumper.
Figure 2:
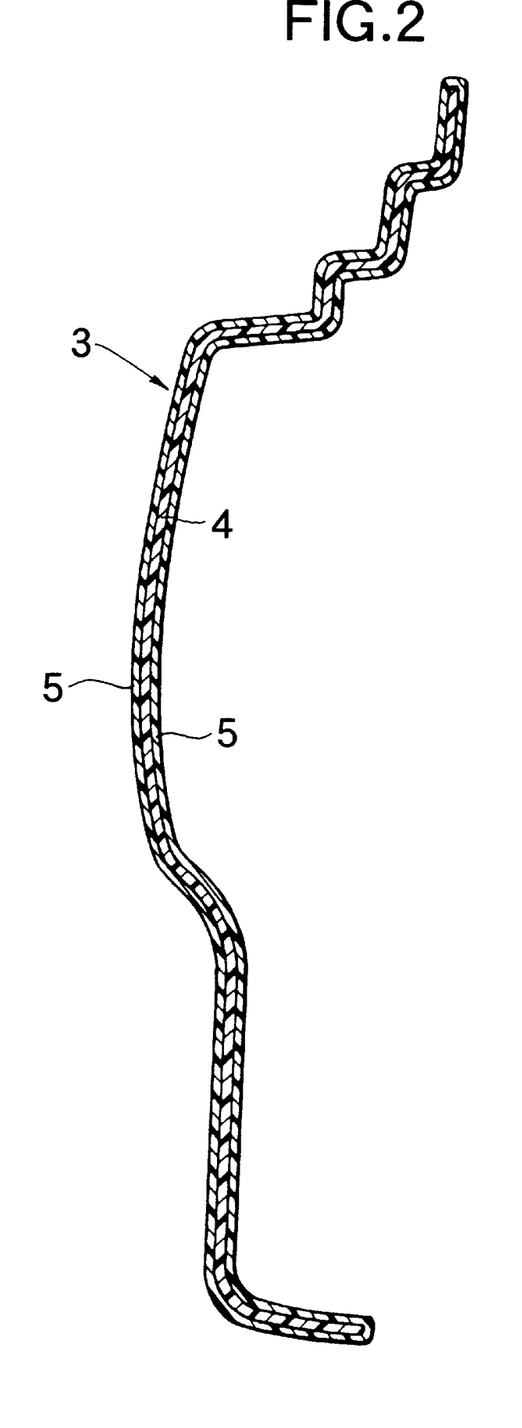
FIG. 2 is a sectional view taken along a line 2—2 in FIG. 1.

Referring to FIG. 1, a bumper 3 made of a synthetic resin as a sandwich-shaped synthetic resin-molded article is mounted at a front portion of a vehicle body 2 of an automobile vehicle 1. The bumper 3 is comprised of a core 4 and an outer layer 5 which covers the core 4, as shown in FIG. 2.

A main material for forming the core 4 is a material resulting from the pulverization of a recovered bumper which has been formed using a polypropylene (PP) modified with an ethylene propylene rubber (EPR) and which has a thermosetting synthetic resin coating film on a surface thereof. A main material for forming the outer layer 5 is a polypropylene modified with an ethylene-propylene rubber.

Figure 3:
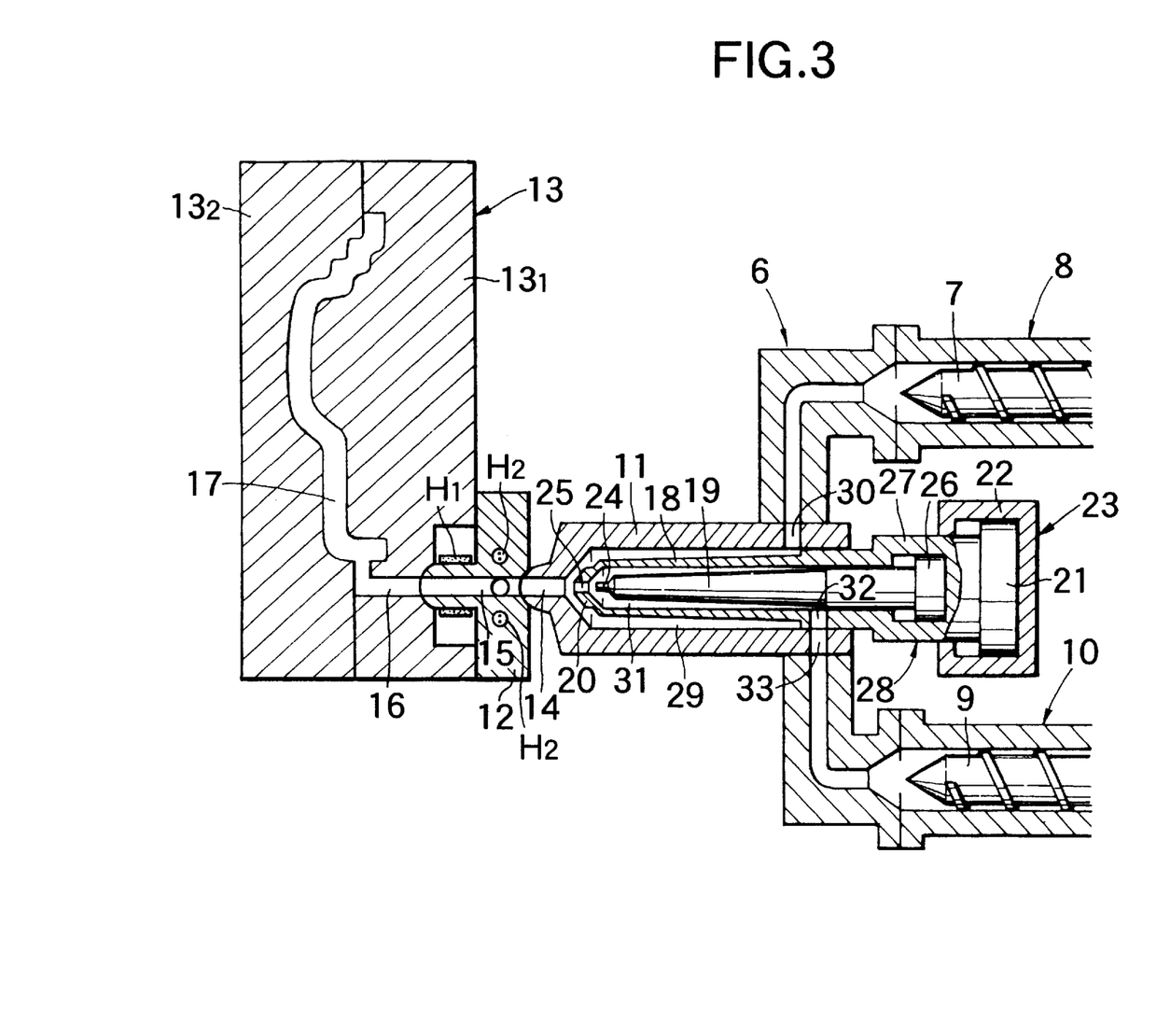
FIG. 3 is a longitudinal sectional view of an injection molding apparatus.

Referring to FIG. 3, an injection molding apparatus 6 used for producing the bumper 3 includes a first injection unit 8 having a screw 7 to inject an outer layer forming material, a second injection unit 10 having a screw 9 to inject a core forming material, a nozzle 11 which connects both the injection units 8 and 10 to each other, a hot runner block 12 connected to the nozzle 11, and a split mold 13 attachable to and detachable from the hot runner block 12. The mold 13 is comprised of a stationary die $13_1$ on the side of the hot runner block 12, and a plurality of movable dies $13_2$ movable toward and away from the stationary die $13_1$.

A supply passage 14 in the nozzle 11 communicates with a plurality of gates 16 in the mold 13 through a hot runner 15. Each of the gates 16 communicates with a bumper forming cavity 17. In FIG. 3, $H_1$ is a band heater, and $H_2$ is a cartridge heater.

A hollow outer needle 18 and a solid inner needle 19 are concentrically disposed within the nozzle 11. In the outer needle 18, a valve portion 20 at a tip end thereof is opposed to the supply passage 14, and a piston 21 at a base end thereof is slidably received in a cylinder 22. The piston 21 and the cylinder 22 constitute a supply passage opening/closing mechanism 23. In the inner needle 19, a valve portion 24 at a tip end thereof is opposed to a valve bore 25 defined in the valve portion 20 of the outer needle 18, and a piston 26 at a base end thereof is slidably received in a cylinder portion 27 defined at the base end of the outer needle 18. The piston 26 and the cylinder portion 27 constitute a valve bore opening/closing mechanism 28.

The outer needle 18 has a tapered outer peripheral surface connected to the valve portion 20 thereof, and an outer passage 29 is defined between such tapered outer peripheral surface and an inner peripheral surface of the nozzle 11. The outer passage 29 is adapted to communicate at one end thereof with the supply passage 14 and at the other end thereof with the first injection unit 8 via a through-bore 30 in the nozzle 11. The outer needle 18 has a straight outer peripheral surface at its base end, so that the through-bore 30 can be closed by the straight outer peripheral surface.

The inner needle 19 has a tapered outer peripheral surface connected to the valve portion 24 thereof, and an inner passage 31 is defined between such tapered outer peripheral surface and an inner peripheral surface of the outer needle 18. The inner passage 31 is adapted to communicate at one end thereof with valve bore 25 and at the other end thereof with the second injection unit 10 via through-bores 32 and 33 in the outer needle 18 and the nozzle 11. The inner needle 19 has a straight outer peripheral surface at its base end, so that the through-bore 32 can be closed by such outer peripheral surface.

A particular example of the production of the bumper 3 using the injection molding apparatus 6 will be described below.

A. Preparation of Core Forming Material

A bumper formed in a molding manner using a polypropylene modified with an ethylene-propylene rubber and having a two-pack urethane coating film on a surface was selected as the recovered bumper. The composition of this recovered bumper was as follows:

| Polypropylene | 64% by weight |
|---|---|
| Ethylene-propylene rubber | 28% by weight |
| Talc | 7% by weight |
| Coating film | 1% by weight |

The recovered bumper was thrown into a pulverizing machine, where it was pulverized. Then, the pulverized material was thrown into a granulator, where it was subjected to a melt-kneading, and the melt-kneaded mass was passed through a filter of 80 to 100 meshes to remove large grains. Thereafter, the melt-kneaded mass was passed through a fine tube having an inside diameter of about 1 mm to form a linear material. The linear material was cut into a length of 1 mm to several mm to provide a pellet-shaped core forming material.

B. Preparation of Outer Layer Forming Material

To provide the same composition as the composition of the recovered bumper (but excluding the coating film), a mixture comprising

| Polypropylene | 63% by weight |
|---|---|
| Ethylene-propylene rubber | 30% by weight |
| Talc | 7% by weight | was thrown into the granulator to produce a pellet-shaped outer layer forming material in a manner similar to that described in the item A.

C. Production of Bumper (i) In FIG. 3, the outer layer forming material was placed into the first injection unit 8 and maintained in a molten state at 210° C., and the core forming material was placed into the second injection unit 10 and maintained in a molten state at 200° C. The stationary die $13_1$ and the movable dies $13_2$ were preheated to 40° C. and 50° C., respectively.

Figure 4:
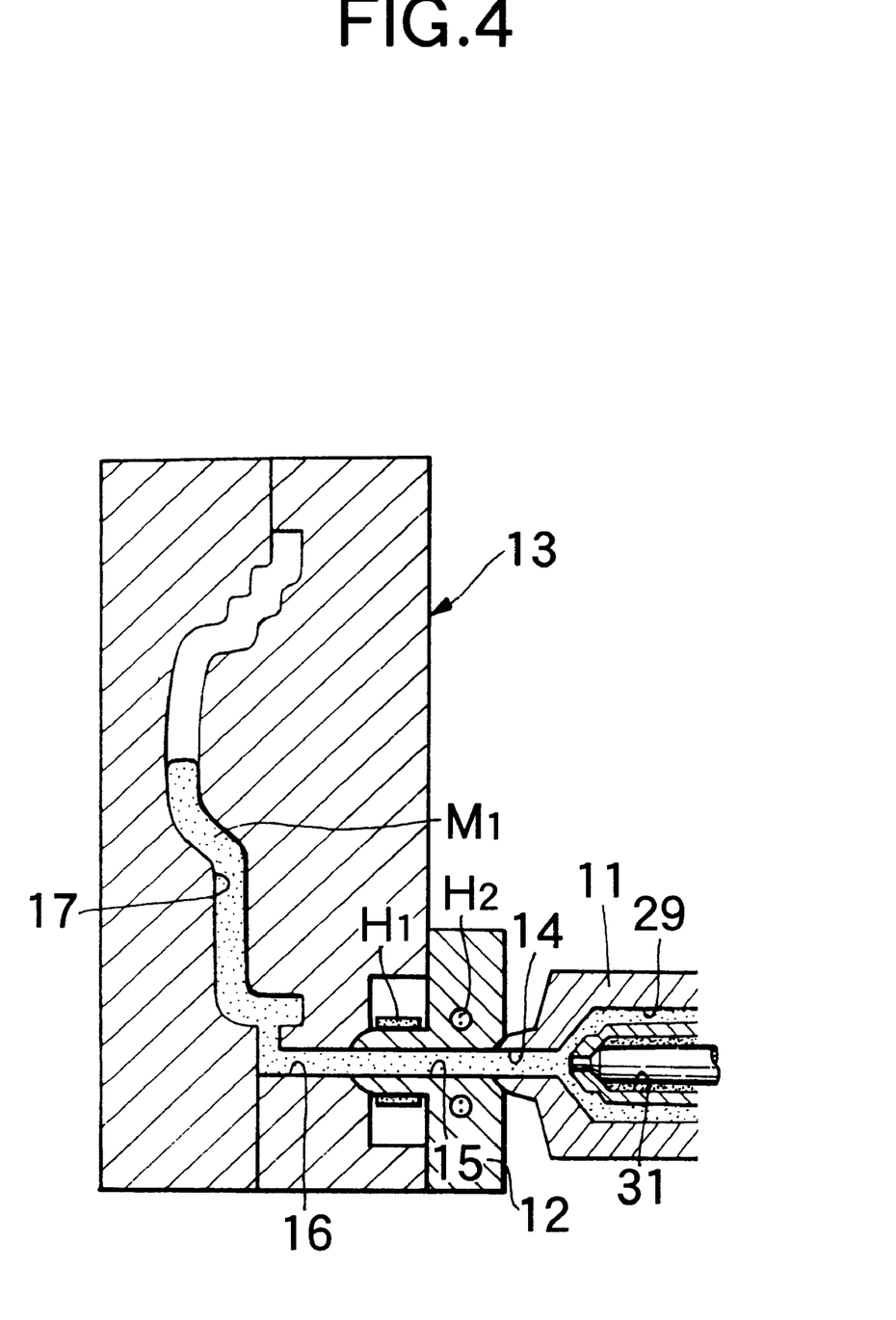
FIG. 4 is a view for explaining a first step.

(ii) At a first step, the outer layer forming material $M_1$ was injected into the bumper forming cavity 17 in the mold 13 through the supply passage 14, the hot runner 15 and the gates 16 under the operation of the first injection unit 8 with the outer passage 29 being in a communicating state and with the inner passage 31 being in a cut-off state, as shown in FIG. 4.

Figure 5:
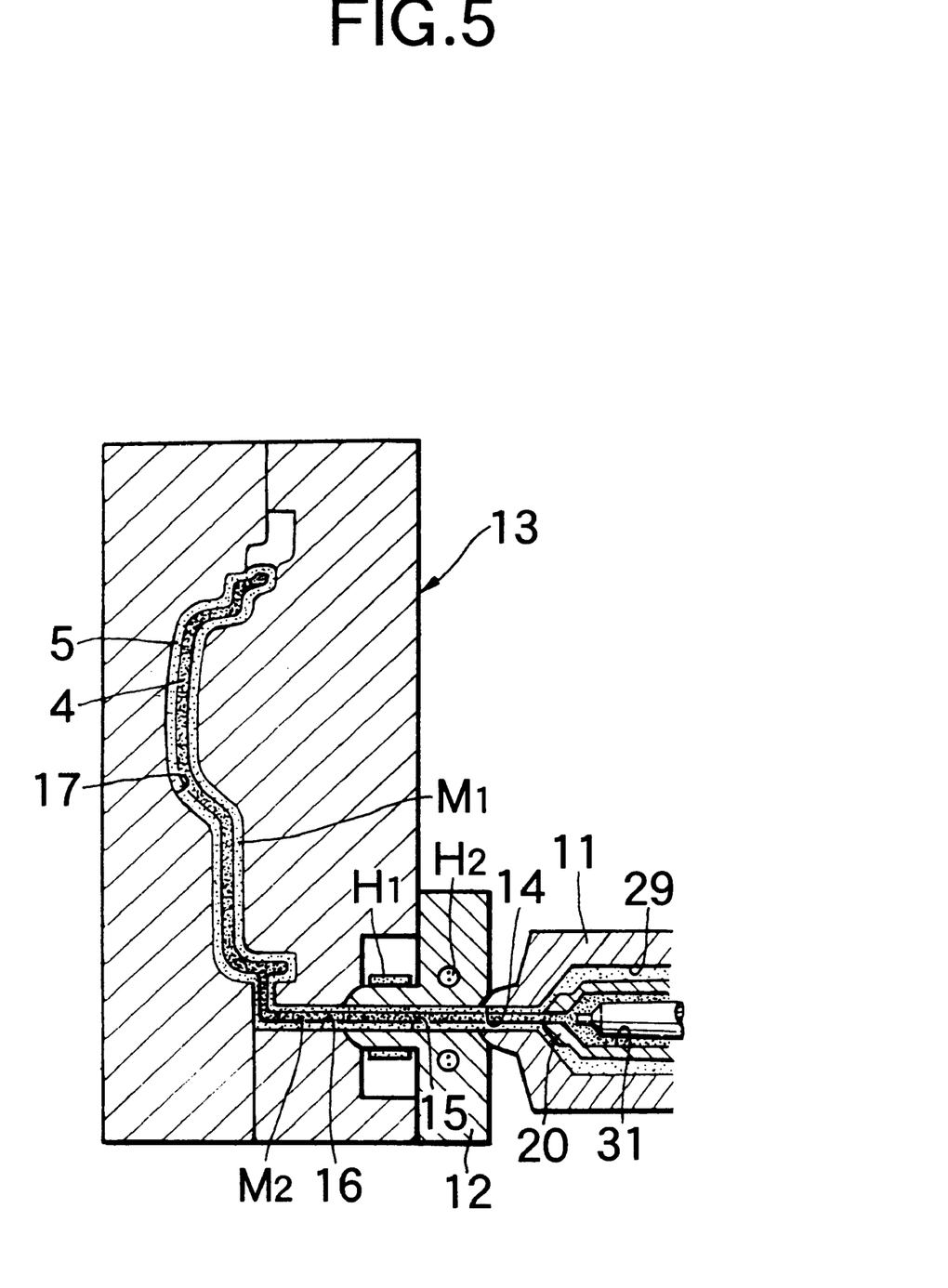
FIG. 5 is a view for explaining a second step.

(iii) At a second step, as shown in FIG. 5, a portion of the outer passage 29 on the side of the supply passage 14 was throttled by the valve portion 20 under the operation of the first injection unit 8, and the core forming material $M_2$ was injected under the operation of the second injection unit 10 with the inner passage 31 being in the communicating state, and was allowed to flow into the outer layer forming material $M_1$ existing within the supply passage 14, the hot runner 15, the gates 16 and the cavity 17. At the same time, the outer layer an forming material $M_1$ and $M_2$ were allowed to flow within the cavity 17. Then, the operation of the second injection unit 10 was stopped.

Figure 6:
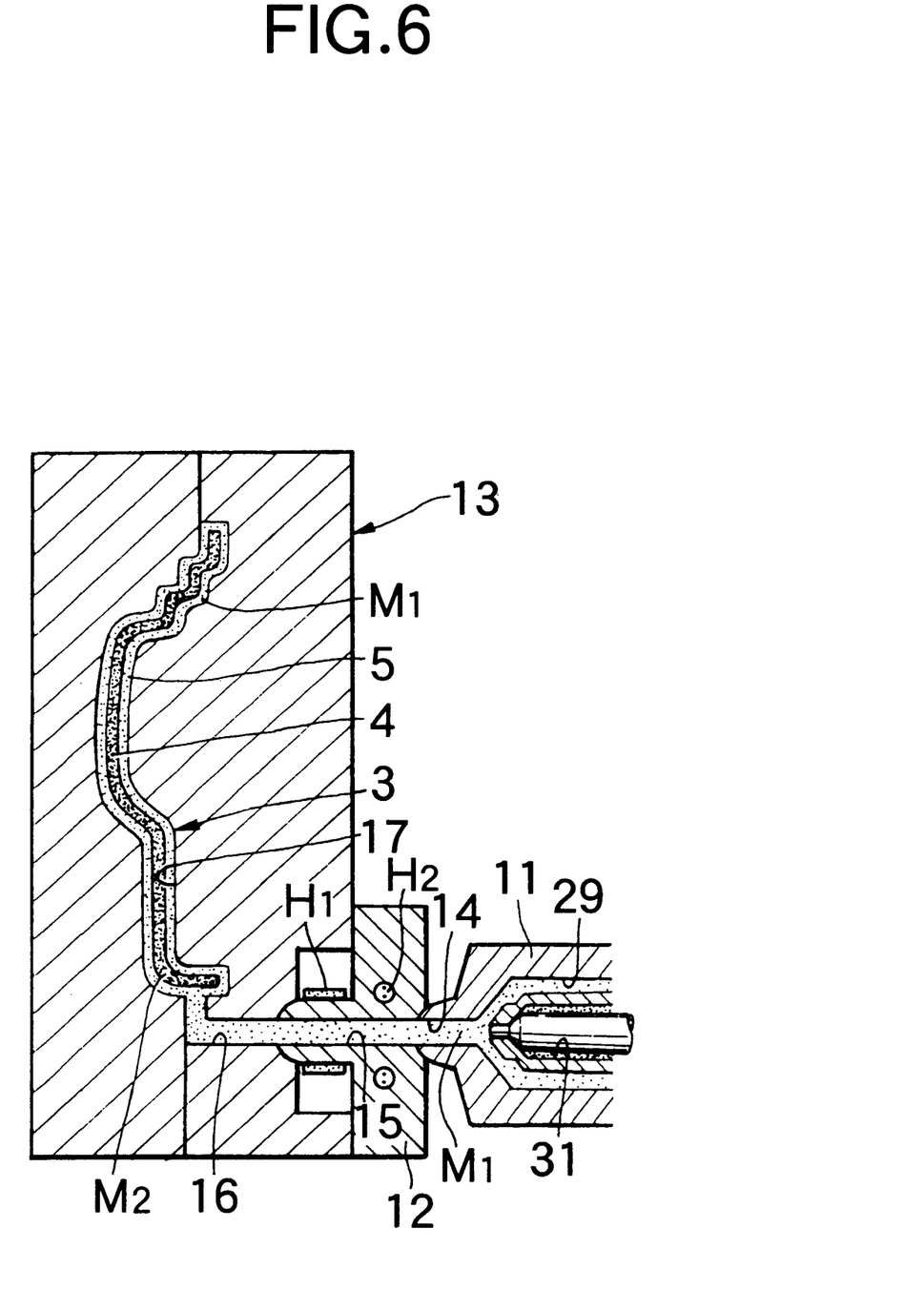
FIG. 6 is a view for explaining a third step.

(iv) At a third step, the outer layer and core forming material $M_1$ and $M_2$ having a double structure and existing within the supply passage 14, the hot runner 15 and the gates 16 were pushed into the cavity 17 by the outer layer forming material $M_1$ under the operation of the first injection unit 8 with the outer passage 29 being in the communicating state and with the inner passage 31 being in the cut -off state, as shown in FIG. 6, thereby forming the core 4 and the outer layer 5. Then, the operation of the first injection unit 8 was stopped.

(v) The mold 13 was separated from the hot runner block 12 and then opened to provide the bumper 3.

After the above-described producing process, the molding of the bumper 3 can be subsequently carried out, because the outer layer forming material $M_1$ has been maintained in the molten state within the hot runner 15.

Table 1 shows the injection times and the injection speeds for the outer layer forming material $M_1$ and the core forming material $M_2$ at the first to third steps in the embodiment.

TABLE 1

|  | Outer layer forming material | | Core forming material | |
| --- | --- | --- | --- | --- |
|  | Injection speed (mm/sec) | Injection time (sec) | Injection speed (mm/sec) | Injection time (sec) |
| At first step | $V_1$ 39.7 | 6.2 | — | — |
| At second step | $Va(V_1)$ 39.7<br>Vb 19.5<br>Vc 9.7 | 1.8<br>1.4<br>0.8 | $V_2$ 48.4 | 4.0 |
| At third step | $V_3(Vc)$ 9.7 | 1.7 | — | — |

Figure 7:
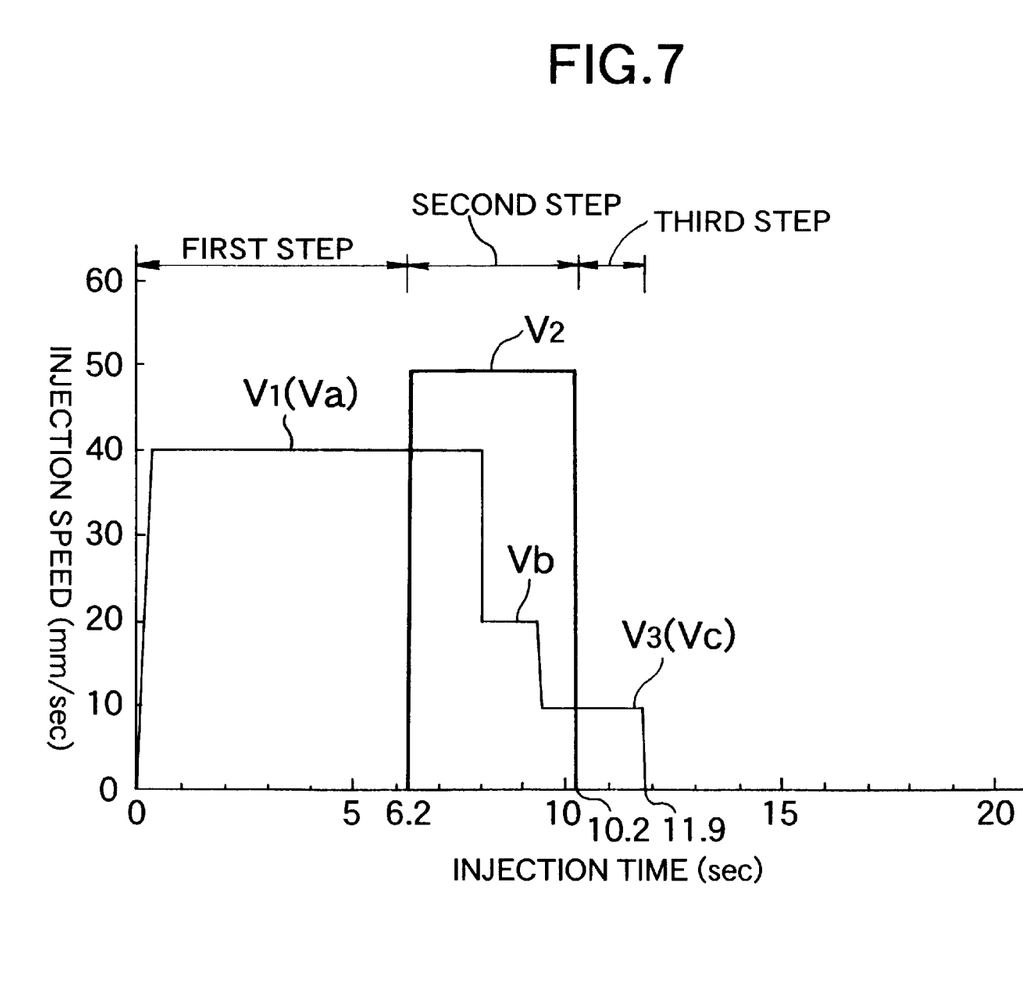
FIG. 7 is a graph illustrating the relationship between the injection time and the injection speed in an embodiment.

FIG. 7 is a graph taken based on Table 1 and illustrating the relationship between the injection time and the injection speed. In this case, the injection speed was controlled at one stage for the outer layer forming material $M_1$ at the first step; at one stage for the core forming material $M_2$ and at three stages for the outer layer forming material $M_1$ at the second step; and at one stage for the outer layer forming material $M_1$ at the third step.

More specifically, at the first step, the outer layer forming material $M_1$ was injected at the injection speed $V_1$ (Va) into the forming cavity 17 in the mold 13 through the gates 16. At the second step, the core forming material $M_2$ was injected at the injection speed $V_2$ higher than the injection speed $V_1$, while injecting the outer layer forming material $M_1$ at the injection speed $V_1$, so that the core forming material $M_2$ was allowed to flow into the outer layer forming material $M_1$ existing within the gates 16 and the cavity 17, and at the same time, the outer layer and core forming materials $M_1$ and $M_2$ were allowed to flow within the cavity 17. Then, the injection speeds Vb and Vc of the outer layer forming material $M_1$ were reduced to be lower than the injection speed $V_1$, while maintaining the injection speed $V_2$. At the third step, the outer layer forming material $M_1$ was injected at the injection speed $V_3$ (Vc) equal to or lower than the final injection speed of the outer layer forming material $M_1$ at the second step, and the outer layer and core forming materials $M_1$ and $M_2$ having a double structure and existing within the gates 16 were pushed into the cavity 17, thereby molding the core 4 and the outer layer 5.

If the injection speed $V_2$ of the core forming material $M_2$ is set at the second step so as to be higher than the injection speed $V_1$ of the outer layer forming material $M_1$ at the first step, as described above, the filling efficiency of the core forming material $M_2$ can be enhanced. Thus, at a time point when a front portion of the outer forming material $M_1$ in a flowing direction reaches near a terminal end of the cavity 17, a front portion of the core forming material $M_2$ in a flowing direction can be permitted to exist within such front portion of the outer forming material $M_1$ in the flowing direction, as shown in FIG. 5.

If the injection speed $V_1$ of the outer layer forming material $M_1$ is reduced to relatively further increase the injection speed $V_2$ of the core forming material $M_2$ before the start of the second step, there is a possibility that the following disadvantage may arise: the thickness of the outer layer 5 is reduced due to the rapid flowing of the core forming material $M_2$ into the outer layer forming material $M_1$. This is liable to occur when the hot runner 15 is used.

In this embodiment, at an initial stage of the start of the second step, the injection speed $V_1$ of the outer layer forming material $M_1$ is maintained at the same level as that at the first step and hence, the disadvantage as described above is reliably avoided.

Thereafter, the injection speeds Vb, Vc of the outer layer forming material $M_1$ are controlled to be lower than the injection speed $V_1$ and hence, the injection speed $V_2$ of the core forming material $M_2$ is relatively further increased. Thus, it is possible to enhance the filling efficiency of the core forming material $M_2$ and in its turn, to shorten the cycle time for the production of the bumper.

If the injection speed $V_3$ of the outer layer forming material $M_1$ at the third step is set to be equal to or lower than the final injection speed Vc of the outer layer forming material $M_1$ at the second step, e.g., to be $V_3=Vc$ in the production of the example 1, the outer layer forming material $M_1$ cannot flow into the core forming material $M_2$ at the third step. Thus, portions of the bumper 3 communicating with the gates can be formed by only the outer layer forming material $M_1$.

In this manner, the example 1 of the bumper 3 having a sandwich structure over the whole thereof could be produced. In this example 1, the filling rate of the core forming material $M_2$ prepared from the recovered bumper is high, which is effective for providing a reduction in production cost of the bumper 3 and the resource-saving.

Table 2 shows the injection times and the injection speeds for the outer layer forming material $M_1$ and the core forming material $M_2$ at the first to third steps in a first comparative example.

TABLE 2

|  | Outer layer forming material | | Core forming material | |
| --- | --- | --- | --- | --- |
|  | Injection speed (mm/sec) | Injection time (sec) | Injection speed (mm/sec) | Injection time (sec) |
| At first step | $V_1$ Va 27.1<br>Vb 26.6<br>Vc 17.0 | 7.0<br>4.1<br>0.3 | — | — |

TABLE 2-continued

| | Outer layer forming material | | Core forming material | |
|---|---|---|---|---|
| | Injection speed (mm/sec) | Injection time (sec) | Injection speed (mm/sec) | Injection time (sec) |
| At second step | Vc 17.0 | 3.9 | $V_2$ Vd 39.7 | 3.9 |
| | | | Ve 29.0 | 0.2 |
| | Vg 9.7 | 0.4 | — Vf 19.4 | 0.2 |
| At third step | $V_3$ (Vg) 9.7 | 1.6 | — | — |

Figure 8:
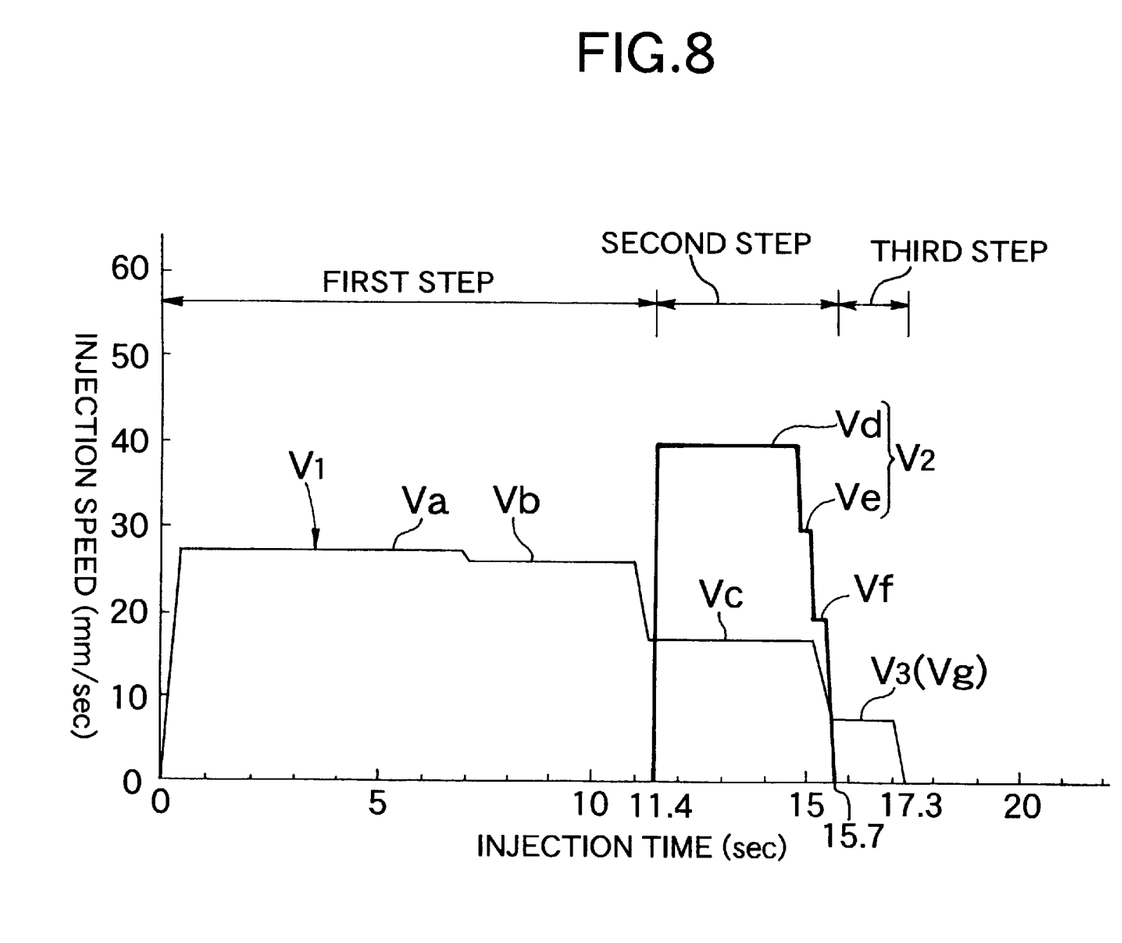
FIG. 8 is a graph illustrating the relationship between the injection time and the injection speed in a first comparative example.

FIG. 8 is a graph taken based on Table 2 and illustrating the relationship between the injection time and the injection speed. In this case, the injection speed was controlled at three stages for the outer layer forming material $M_1$ at the first step; at three stages for the core forming material $M_2$ and at two stages for the outer layer forming material $M_1$ at the second step; and at one stage for the outer layer forming material $M_1$ at the third step. Before the start of the second step, the injection speed of the outer layer forming material $M_1$ is set at Vc to be remarkably lower than Vb.

Table 3 shows the injection times and the injection speeds for the outer layer forming material $M_1$ and the core forming material $M_2$ at the first to third steps in a second comparative example.

TABLE 3

| | Outer layer forming material | | Core forming material | |
|---|---|---|---|---|
| | Injection speed (mm/sec) | Injection time (sec) | Injection speed (mm/sec) | Injection time (sec) |
| At first step | $V_1$ Va 46.0 | 5.9 | — | — |
| | Vb 24.7 | 0.5 | | |
| At second step | Vb 24.7 | 1.5 | $V_2$ 48.4 | 3.8 |
| | Vc 15.1 | 1.7 | | |
| | Vd 9.7 | 0.9 | | |
| At third step | $V_3$ (Vd) 9.7 | 1.6 | — | — |

Figure 9:
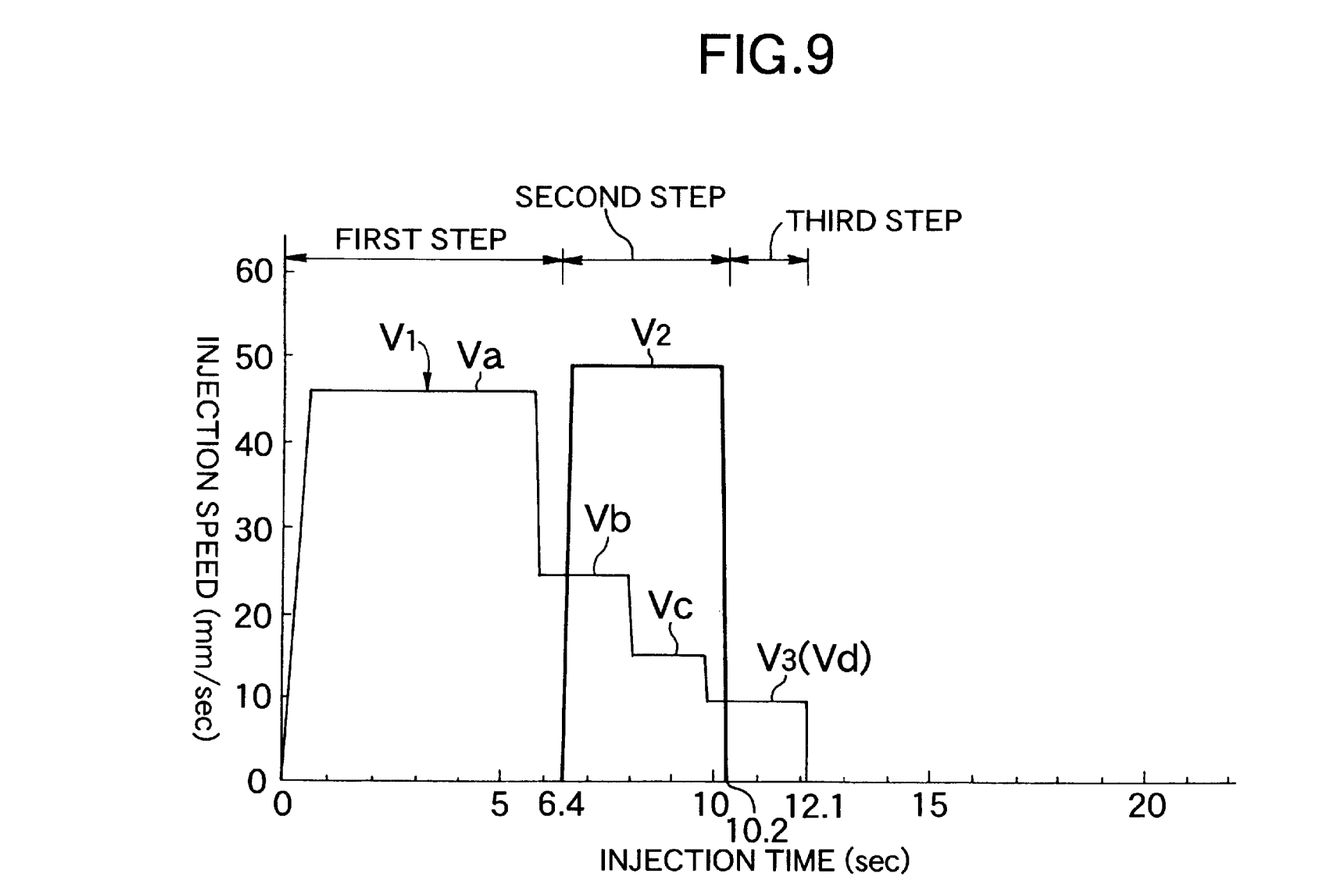
FIG. 9 is a graph illustrating the relationship between the injection time and the injection speed in a second comparative example.

FIG. 9 is a graph taken based on Table 3 and illustrating the relationship between the injection time and the injection speed. In this case, the injection speed was controlled at two stages for the outer layer forming material $M_1$ at the first step; at one stage for the core forming material $M_2$ and at three stages for the outer layer forming material $M_1$ at the second step; and at one stage for the outer layer forming material $M_1$ at the third step. Before the start of the second step, the injection speed of the outer layer forming material $M_1$ is set at Vb to be remarkably lower than Va as described above.

In the first and second comparative examples, the injection speed of the outer layer forming material is set before the start of the second step so as to be remarkably lower than of the preceding step, as described above. Therefore, there is a possibility that a reduction in thickness of the outer layer 5 may be brought about, as described above, but in the embodiment, there is not such a possibility.

As apparent from FIGS. 7 to 9, the injection time in the embodiment is 11.9 seconds, whereas the injection times in the first and second comparative examples are 17.3 seconds and 12.1 seconds, respectively. Therefore, in the embodiment, the cycle time for the production of the bumper is shortened, as compared with the first and second comparative examples, leading to a good mass productivity.

Table 4 shows the injection times and the injection speeds for the outer layer forming material $M_1$ and the core forming material $M_2$ at the first and second steps in a third comparative example.

TABLE 4

| | Outer layer forming material | | Core forming material | |
|---|---|---|---|---|
| | Injection speed (mm/sec) | Injection time (sec) | Injection speed (mm/sec) | Injection time (sec) |
| At first step | Va 39.7 | 7.3 | — | — |
| At second step | Va 39.7 | 1.0 | Vb 26.6 | 6.5 |
| | Ve 29.2 | 0.7 | Vc 16.9 | 0.4 |
| | Vf 19.4 | 1.1 | Vd 9.7 | 0.4 |

Figure 10:
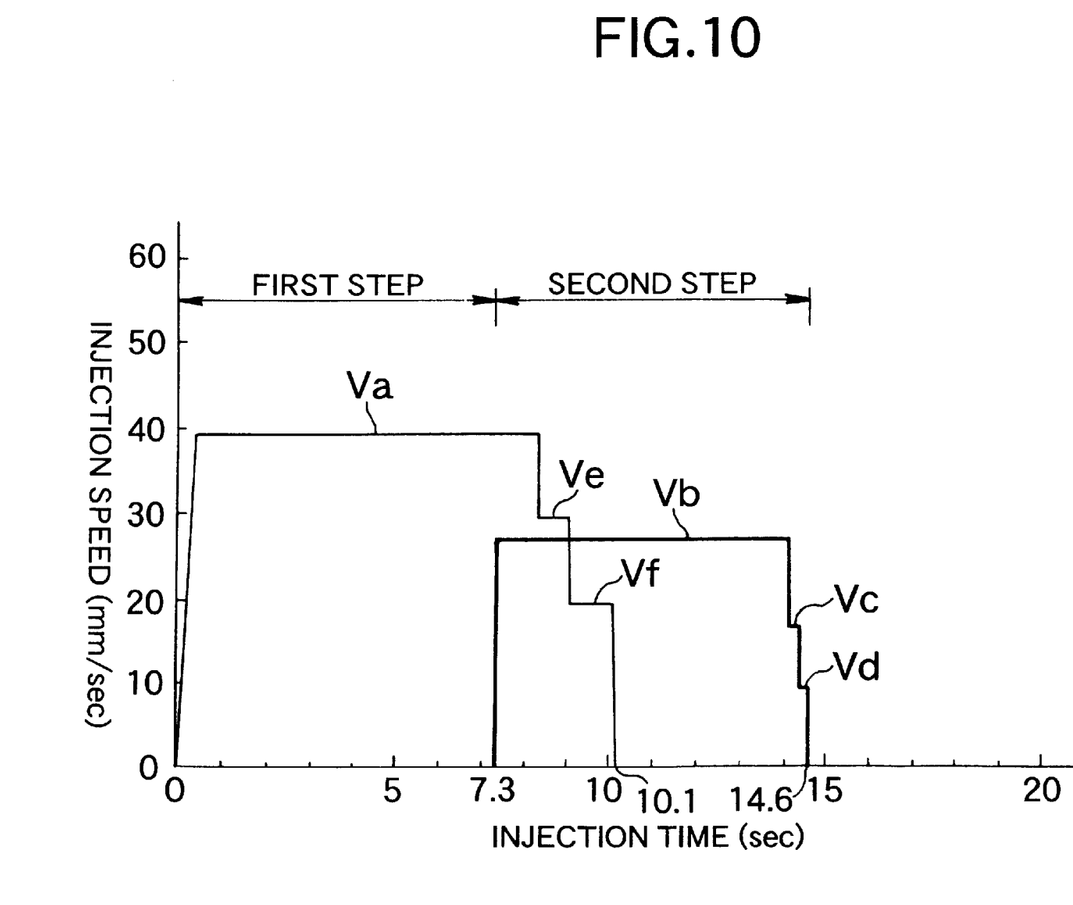
FIG. 10 is a graph illustrating the relationship between the injection time and the injection speed in a third comparative example.

FIG. 10 is a graph taken based on Table 4 and illustrating the relationship between the injection time and the injection speed. In this case, the injection speed was controlled at one stage for the outer layer forming material $M_1$ at the first step, and at three stages for the core forming material $M_2$ and at two stages for the outer layer forming material $M_1$ at the second step.

Due to the fact that the injection speed Vb of the core forming material $M_2$ at the second step was set lower than the injection speed Va of the outer layer forming material $M_1$ at the first step from the start of the injection, the following disadvantage was produced: In the case of the bumper in the third comparative example, the core forming material $M_2$ was not permitted to flow into the front portion of the outer layer forming material $M_1$ in the flowing direction, and the core forming material $M_2$ broke through the outer layer forming material $M_1$ at a location short of such front portion to bite into the surface of the outer layer forming material $M_1$. In addition, because there is no third step in the case of the third comparative example, it is impossible to carry out the continuous molding.

In addition to those described above, the outer layer forming material $M_1$ used for the production of the bumper 3 includes those described below.

[Formulation 1]

| Polypropylene | 63% by weight |
| Ethylene-propylene rubber | 30% by weight |
| Talc | 7% by weight |
| Weather-proof stabilizer | 1 phr |
| UV absorbent | 1 phr |
| Carbon black (pigment) | 3 phr |
| Coating-property improving modifier | 3 phr |

[Formulation 2]

| Polypropylene | 60% by weight |
| Ethylene-propylene rubber | 30% by weight |
| Talc | 10% by weight |
| Weather-proof stabilizer | 1 phr |
| UV absorbent | 1 phr |
| Carbon black (pigment) | 3 phr |
| Coating-property improving modifier | 3 phr |

In addition to those described above, the core forming material $M_2$ used for the production of the bumper 3 includes those described below.

(1) A forming material comprising 93% by weight of a polypropylene and 7% by weight of talc. In this case, the polypropylene includes 30% by weight of an ethylene-propylene based rubber synthesized simultaneously with the step of polymerizing the polypropylene. The talc was added to the synthesized product at the final step of the production of the polypropylene. This forming material is more inexpensive than a forming material made by separately synthesizing a polypropylene and an ethylene-propylene rubber and blending them together.

(2) Forming Material having the following composition:

| | |
|---|---|
| Polypropylene | 60% by weight |
| Ethylene-propylene rubber | 30% by weight |
| Talc | 10% by weight |

It should be noted that the present invention is applied to the production of a sandwich-shaped synthetic resin-molded article, e.g., vehicle parts such as an instrument panel, a console box and the like, and boxes for domestic electric articles.

What is claimed is:

1. A process for producing a sandwich-shaped synthetic resin-molded article comprising a core and an outer layer which covers said core, said process comprising a first step of injecting an outer layer forming material into a forming cavity in a mold through a gate at an injecting speed $V_1$, a second step of injecting a core forming material into said cavity at an injection speed $V_2$ higher than the injection speed $V_1$, while injecting the outer layer forming material at the injection speed $V_1$, in order to allow the core forming material to flow into the outer layer forming material present within the gate and the cavity and to allow the outer layer and core forming materials to flow within the cavity, the injection speed of the outer layer forming material being then reduced to be lower than the injection speed $V_1$, while the injection speed $V_2$ is maintained, and a third step of injecting said outer layer forming material at an injection speed $V_3$ equal to or lower than a final injection speed of said outer layer forming material at said second step, and pushing said core and outer layer forming materials having a double structure existing within said gate into said cavity, thereby molding the core and the outer layer.

2. A process for producing a sandwich-shaped synthetic resin-molded article according to claim 1, wherein the injection of said core and outer layer forming materials into said gate is conducted through a hot runner.

* * * * *